(12) United States Patent
Ebiko

(10) Patent No.: US 7,506,676 B2
(45) Date of Patent: Mar. 24, 2009

(54) PNEUMATIC TIRE WITH TREAD HAVING V-SHAPED TRANSVERSE GROOVES

(75) Inventor: Masahiro Ebiko, Hiratsuka (JP)

(73) Assignee: The Yokohama Runner Co., Ltd., Tokyo (JP)

( * ) Notice: Subject to any disclaimer, the term of this patent is extended or adjusted under 35 U.S.C. 154(b) by 411 days.

(21) Appl. No.: 10/560,783

(22) PCT Filed: Jul. 13, 2004

(86) PCT No.: PCT/JP2004/009964

§ 371 (c)(1),
(2), (4) Date: Dec. 14, 2005

(87) PCT Pub. No.: WO2005/005170

PCT Pub. Date: Jan. 20, 2005

(65) Prior Publication Data

US 2006/0118222 A1     Jun. 8, 2006

(30) Foreign Application Priority Data

Jul. 14, 2003     (JP)     ............... 2003-273911

(51) Int. Cl.
*B60C 11/11*     (2006.01)
*B60C 11/12*     (2006.01)

(52) U.S. Cl. .................. 152/209.18; 152/209.27; 152/209.28; 152/DIG. 3

(58) Field of Classification Search ............ 152/209.18, 152/209.27, 209.28, DIG. 3; D12/557–567
See application file for complete search history.

(56) References Cited

U.S. PATENT DOCUMENTS

| | | | | |
|---|---|---|---|---|
| 2,770,279 A | * | 11/1956 | Harrison ................. | 152/209.28 |
| 4,574,856 A | * | 3/1986 | Graas ..................... | 152/209.28 |
| 4,641,696 A | * | 2/1987 | Semin et al. ........... | 152/209.28 |
| 5,373,882 A | * | 12/1994 | Nakagawa .............. | 152/209.28 |
| 5,435,364 A | * | 7/1995 | Hasegawa et al. ...... | 152/209.28 |
| 6,450,223 B1 | * | 9/2002 | Landers et al. ......... | 152/209.28 |
| 6,571,844 B1 | * | 6/2003 | Ochi et al. ............. | 152/209.27 |
| D507,233 S | * | 7/2005 | Daisho et al. .......... | D12/559 |

FOREIGN PATENT DOCUMENTS

| | | | |
|---|---|---|---|
| JP | 01-178006 | * | 7/1989 |
| JP | 01-178006 A1 | | 7/1989 |
| JP | 06-239111 | | 8/1994 |
| JP | 2000-255217 A1 | | 9/2000 |
| JP | 2002-264612 | | 9/2002 |

OTHER PUBLICATIONS

International Search Report, Sep. 14, 2004.

* cited by examiner

*Primary Examiner*—Steven D Maki
(74) *Attorney, Agent, or Firm*—Greer, Burns & Crain, Ltd.

(57) ABSTRACT

A tread surface the tire rotational direction of which is specified in one direction includes a first main see-through groove extending in the circumferential direction of the tire in a region of from 4% to 15% of the tire ground contact width from the tire equatorial plane toward each of left and right sides. Lug grooves obliquely extend from the first main see-through grooves toward the outer sides of the tire in the reverse rotational direction of the tire so as to communicate with the tire ground contact ends, the lug grooves being disposed at prescribed intervals in the circumferential direction of the tire. Blocks are defined by the lug grooves and the first main see-through grooves. V-shaped transverse grooves are disposed between the first main see-through grooves at prescribed intervals in the circumferential direction of the tire, the transverse grooves having vertexes that face to the reverse rotational direction of the tire. Blocks are defined by the transverse grooves and the first main see-through grooves. The groove width W of each transverse groove measured in the circumferential direction of the tire is ranged from 0.1 L to 0.25 L with respect to the tire circumferential length L of the block adjacent the transverse groove. The ratio ACA/GCA of the total ground contact area ACA of the blocks to the ground contact area GCA of the entire tread surface is in the range of 55% to 75%.

8 Claims, 1 Drawing Sheet

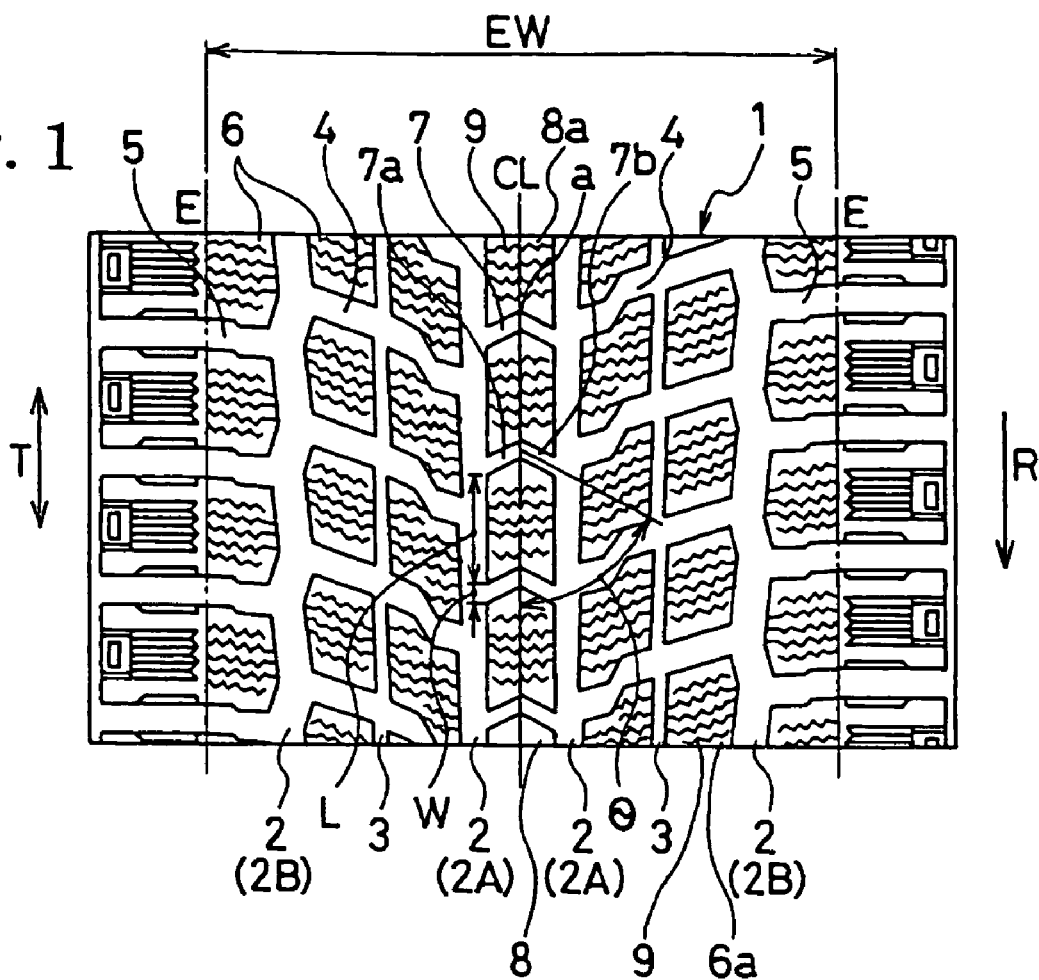

PNEUMATIC TIRE WITH TREAD HAVING V-SHAPED TRANSVERSE GROOVES

TECHNICAL FIELD

The present invention relates to pneumatic tires adapted for icy and snowy roads, and more particularly, to a pneumatic tire which can improve braking performance on wet road surfaces and traction performance on snow while ensuring performance on ice.

TECHNICAL BACKGROUND

Conventionally, there is well-known a pneumatic tire for icy and snowy roads having a directional tread pattern including V-shaped grooves disposed therein, in which a center rib is provided on the equatorial plane of the tire in the tread surface to enhance ice performance (see Unexamined Japanese Patent Application Publication No. 2000-255217, for example). Since the center rib increases the ground contact area, ground contact properties with respect to icy road surfaces increase to enhance performance on ice.

However, Provision of the center rib reduces the ratio of groove area, compared with blocks, whereby a decrease in braking performance on wet road surfaces can not be avoided. Another problem is that snow traction performance is deteriorated.

DISCLOSURE OF THE INVENTION

An object of the present invention is to provide a pneumatic tire which can improve wet braking and snow traction performance while ensuring performance on ice.

In order to achieve the above object, the present invention provides a pneumatic tire including a tread surface having a direction of rotation of the tire which is specified in one direction, the tread surface comprising: a first main see-through groove extending in a circumferential direction of the tire in a region of from 4% to 15% of a ground contact width of the tire from an equatorial plane of the tire toward each of left and right sides; lug grooves obliquely extending from the first main see-through grooves toward outer sides of the tire in a reverse rotational direction of the tire so as to communicate with ground contact ends of the tire, the lug grooves being disposed at prescribed intervals in the circumferential direction of the tire; blocks being defined by the lug grooves and the first main see-through grooves; V-shaped transverse grooves being disposed between the first main see-through grooves at prescribed intervals in the circumferential direction of the tire, the transverse grooves having vertexes that face to the reverse rotational direction of the tire; and blocks being defined by the transverse grooves and the first main see-through grooves, wherein each transverse groove has a groove width W measured in the circumferential direction of the tire, the groove width W being ranged from 0.1 L to 0.25 L with respect to a tire circumferential length L of the block adjacent the transverse groove, a ratio ACA/GCA of a total ground contact area ACA of the blocks to a ground contact area GCA of the entire tread surface being 55% to 75%.

According to the present invention described above, because there are blocks defined by the transverse grooves between the first main see-through grooves instead of a conventional rib disposed therebetween, the groove area increases, whereby snow traction performance can be enhanced.

Although a directional tread pattern having lug grooves inclined in the reverse rotational direction of the tire tends to collect water in the center side of the tire during traveling on wet road surfaces, the transverse grooves are arranged so as to be in V shapes having vertexes facing to the reverse rotational direction of the tire, as described above, whereby water removed by the edges of the blocks providing water screen removing effects smoothly flows into the first main see-through grooves through the transverse grooves. Therefore, the ground contact properties of the blocks with wet road surfaces or icy road surfaces can be secured in the center region of the tread surface, whereby braking performance on wet road surfaces can be enhanced, and braking performance on ice that is equal to or more than that of the prior art tire having a center rib can be obtained.

BRIEF DESCRIPTION OF THE DRAWING

FIG. 1 is a partial development view of a tread surface showing an embodiment of a pneumatic tire according to the present invention.

BEST MODES FOR CARRYING OUT THE INVENTION

An embodiment of the present invention will be described in detail below with reference to the attached drawing.

In FIG. 1, reference numeral 1 denotes a tread surface the tire rotational direction R of which is specified in one direction. The tread surface 1 has four main see-through grooves 2 extending in the circumferential direction T of the tire. The four main see-through grooves 2 are disposed at symmetrical positions on the left and right sides of the equatorial plane CL of the tire in the tread surface 1, and includes two first main see-through grooves 2A placed inside, the two first main see-through grooves being located in respective regions of the tread surface 1 from 4% to 15% of the ground contact width EW of the tire from the tire equatorial plane CL toward the left and right sides.

Two narrow circumferential grooves 3, which each extend in the tire circumferential direction T and are smaller in groove width than the main see-through grooves 2, are symmetrically disposed on the left and right sides of the tire equatorial plane CL, one of the two narrow circumferential grooves 3 being placed between the first main see-through groove 2A located on the left side of the tire equatorial plane CL and a second main see-through groove 2B disposed outwardly thereof, the other one of two narrow circumferential grooves 3 being placed between the first main see-through groove 2A located on the right side of the tire equatorial plane CL and a second main see-through groove 2B disposed outwardly thereof.

Left and right first lug grooves 4, which obliquely extend from the two first main see-through grooves 2A toward the outer sides of the tire in the reverse rotational direction of the tire and communicate with the second main see-through grooves 2B, are disposed at predetermined intervals in the tire circumferential direction T. Left and right second lug grooves 5, which extend from the two second main see-through grooves 2B toward the outer sides of the tire and communicate with and extend outward beyond the ground contact ends E of the tire, are provided at predetermined intervals in the tire circumferential direction T. The first lug grooves 4 are offset from the second lug grooves 5 in the tire circumferential direction, and many blocks 6 are defined by the main see-through grooves 2, narrow circumferential grooves 3, and first and second lug grooves 4 and 5.

Disposed between the first main see-through grooves 2A at predetermined intervals in the tire circumferential direction T are V-shaped (reversely V-shaped in the drawing) transverse grooves 7 having vertexes a that are located substantially on the tire equatorial plane CL and face to the reverse rotational direction of the tire. A plurality of blocks 8 are defined by the first main see-through grooves 2A and the transverse grooves 7 on the tire equatorial plane CL.

The ratio ACA/GCA of the total ground contact area ACA (mm$^2$) of all the blocks 6 and 8 to the ground contact area GCA (mm$^2$) of the whole tread surface 1 (the ground contact area of the tread surface before no grooves are provides therein) is ranged from 55% to 75%. The blocks 6 and 8 have ground contact faces 6a and 8a, each having a plurality of sipes 9 extending in a zig-zag path in the widthwise direction of the tire.

The groove width W (mm) of each transverse groove 7 measured parallel to the tire circumferential direction T is in the range from 0.1 L to 0.25 L with respect to the tire circumferential direction length L of the block 8 adjacent thereto.

According to the present invention described above, since there are the blocks 8 defined by the transverse grooves 7 between the first main see-through grooves 2A instead of a conventional rib disposed therebetween, the groove area increases, whereby snow traction performance can be improved.

Although a directional tread pattern having left and right first lug grooves 4 inclined in the reverse rotational direction of the tire tends to collect water in the center side of the tire during traveling on wet road surfaces, the transverse grooves 7 are arranged so as to be in V shapes having vertexes a facing to the reverse rotational direction of the tire, whereby water removed by the edges of the blocks 8 providing water screen removing effects smoothly flows into the first main see-through grooves 2A through the transverse grooves 7. Therefore, in the center region of the tread surface 1, the ground contact properties of the blocks 8 with wet road surfaces or icy road surfaces can be ensured, thereby allowing braking performance on wet road surfaces to be enhanced and braking performance on ice that is equal to or more than that of the prior art tire having a center rib to be secured.

If the first main see-through grooves 2A are located more inwardly of the positions of 4% of the tire ground contact width EW, rigidity of the blocks 8 decrease to thereby deteriorate the ground contact properties, so braking performance on ice is reduced. If the first main see-through grooves 2A are located more outwardly of the positions of 15% of the tire ground contact width EW also, braking performance on ice decreases. Preferably, each first main see-through groove 2A is located in the region ranged from 6% to 13% of the tire ground contact width EW.

If the groove width W of the transverse grooves 7 is less than 0.1 L, it is difficult to effectively improve snow traction performance because the groove width is too narrow. If the groove width W of the transverse grooves 7 is greater than 0.25 L, rigidity of the blocks 8 decreases, thereby reducing braking performance on ice.

The ratio ACA/GCA is less than 55%, it is difficult to ensure block rigidity, thereby reducing braking performance on ice. If the ratio ACA/GCA is greater than 75%, it is difficult to secure braking performance on wet road surfaces and snow traction performance.

In the present invention, each of the above transverse grooves 7 is preferably arranged such that the inclination angle θ of each of the groove portions 7a and 7b forming a V shape is 45 degrees to 85 degrees with respect to the tire circumferential direction T. If the inclination angle θ is less than 45 degrees, rigidity of the blocks 8 is reduced. If the inclination angle θ is greater than 85 degrees, it is not preferable because water does not flow smoothly in the transverse grooves 7 when braking is applied on wet road surfaces. More preferably, the inclination angle θ is 70 degrees to 80 degrees.

The transverse grooves 7 may be U-shaped grooves the circularly curved portions of which have vertexes a; the V-shaped transverse grooves 7 in the present invention include such grooves.

The above second main see-through grooves 2B are preferably provided in respective regions of the tread surface 1 ranged from 35% to 45% of the tire ground contact width EW from the tire equatorial plane CL toward the left and right sides. If the second main see-through grooves 2B are located more inwardly of the positions of 35% of the tire ground contact width EW, rigidity of the blocks 6 decreases to thereby deteriorate ground contact properties, which badly affects on braking performance on ice, snow traction performance and wet braking performance. If the second main see-through grooves 2B are located more outwardly of the positions of 45% of the tire ground contact width EW, drainage performance is reduced and uneven wear resistance is deteriorated.

It is preferable in terms of snow traction performance that STI (snow traction index) be 150 or more. The upper limit thereof may be 250 or less in terms of block rigidity.

Rubber used for a tread rubber layer having the tread surface 1 on its outer surface preferably includes rubber having a JIS A hardness of 40 to 60, and more preferably 43 to 55, in terms of performance on ice.

The see-through width of the main see-through grooves 2 is 2 mm to 10 mm, and preferably 4 mm to 8 mm.

In the present invention, the main see-through grooves are main grooves which can be seen through from one ends thereof to the other ends when the tread surface 1 is fully developed around the entire circumference of the tire; the see-through width is, when the main see-through grooves are seen through from one ends thereof to the other ends, the width of the grooves which can be seen through.

The tire ground contact width EW is the distance between the tire ground contact ends E measured under conditions of an air pressure of 180 kPa and a load corresponding to 88% of the maximum load capability when the tire is mounted on the standard rim according to JATMA YEAR BOOK 2002.

The present invention is preferably used for a pneumatic tire for passenger cars suitable for icy and snowy roads in particular.

EXAMPLE 1

Prepared were four test tires each according to the present invention tires 1 to 3, comparison tires 1 to 3, and conventional tire 1, having the same tire sizes of 215/70R16; the present invention tires 1 to 3 and comparison tires 2 and 3 each had a pattern shown in FIG. 1, in which the groove width W of the V-shaped transverse grooves with vertexes facing to the reverse rotational direction of the tire, the ratio ACA/GCA of the total ground contact area ACA of the blocks to the ground contact area GCA of the entire tread surface, and the position of each first main see-through groove were as shown in Table 1; the comparison tire 1 had the same pattern as the present invention tire 1 except that the vertexes of the transverse grooves faced to the rotational direction of the tire; and the conventional tire 1 had the same pattern as the present invention tire 1 except that there was a rib between the first main see-through grooves.

The inclination angle θ of each groove portion of each of the present invention tires and comparison tires was 70 degrees. The ratio ACA/GCA of the conventional tire was a value where the total ground contact area ACA of the blocks included the area of the rib. The second main see-through grooves of each test tire were located at the positions of 40% of the tire ground contact width EW.

The test tires were seated on 16×7JJ sized rims and inflated to air pressure of 200 kPa, and each four test tires were mounted on a passenger car of 2000 cc displacement; evaluation testing for wet braking performance, snow traction performance and ice braking performance was carried out according to the following testing methods, obtaining the results shown in Table 1.

Wet Braking Performance

The car was run on a wet road test course, and full braking was applied to the car running straight at a speed of 100 km/h until the car was stopped, measuring the stop distance. This test was repeated five times for each four test tires, and the average distance was obtained from three stop distances with the exception of the maximum and minimum stop distances, representing the result by an index where the conventional tire was 100. AS the index value is greater, wet braking performance is better.

Snow Traction Performance

Feeling testing was conducted by three test drivers on a snowy road test course, and the result was evaluated using the average of values evaluated by the three drivers and represented by an index where the conventional tire was 100. AS the index value is greater, snow traction performance is better.

Ice Braking Performance

The car was run on an icy road test course, and full braking was applied to the car running straight at a speed of 40 km/h until the car was stopped, measuring the stop distance. This test was repeated five times for each four test tires, and the average distance was obtained from three stop distances with the exception of the maximum and minimum stop distances, representing the result by an index where the conventional tire was 100. AS the index value is greater, ice braking performance is better.

As seen from Table 1, the present invention tires having V-shaped transverse grooves with vertexes facing to the reverse rotational direction of the tire and first main see-through grooves positioned in the range from 4% to 15% can improve wet braking and snow traction performance while ensuring performance on ice.

EXAMPLE 2

Prepared were four test tires each according to the present invention tires 4 to 6 and comparison tires 4 and 5, having the same tire sizes as in EXAMPLE 1; the present invention tires 4 to 6 and comparison tires 4 and 5 each had a pattern shown in FIG. 1, in which the groove width W of the V-shaped transverse grooves with vertexes facing to the reverse rotational direction of the tire, the ratio ACA/GCA of the total ground contact area ACA of the blocks to the ground contact area GCA of the entire tread surface, and the position of each first main see-through groove were as shown in Table 2.

The inclination angle θ of each groove portion of each test tire was 70 degrees, and the second main see-through grooves were located at the positions of 40% of the tire ground contact width EW.

Evaluation testing for wet braking performance, snow traction performance and ice braking performance was carried out on the test tires as in EXAMPLE 1, obtaining the results shown in Table 2.

TABLE 2

|  | Comparison Tire 4 | Present Invention Tire 4 | Present Invention Tire 5 | Present Invention Tire 6 | Comparison Tire 5 |
| --- | --- | --- | --- | --- | --- |
| Groove Width W | 0.05 L | 0.1 L | 0.2 L | 0.25 L | 0.3 L |
| Ratio ACA/GCA (%) | 65 | 65 | 65 | 65 | 65 |
| Main see-through Groove Position (%) | 8 | 8 | 8 | 8 | 8 |
| Wet Braking Performance | 100 | 105 | 110 | 105 | 100 |
| Snow Traction Performance | 100 | 103 | 105 | 105 | 103 |

TABLE 1

|  | Conventional Tire | Comparison Tire 1 | Comparison Tire 2 | Present Invention Tire 1 | Present Invention Tire 2 | Present Invention Tire 3 | Comparison Tire 3 |
| --- | --- | --- | --- | --- | --- | --- | --- |
| Groove Width W | — | 0.2 L | 0.2 L | 0.2 L | 0.2 L | 0.2 L | 0.2 L |
| Ratio ACA/GCA (%) | 70 | 65 | 65 | 65 | 65 | 65 | 65 |
| Main see-through Groove Position (%) | 8 | 8 | 2 | 4 | 10 | 15 | 20 |
| Wet Braking Performance | 100 | 103 | 100 | 105 | 108 | 103 | 98 |
| Snow Traction Performance | 100 | 105 | 100 | 103 | 108 | 110 | 110 |
| Ice Braking Performance | 100 | 97 | 98 | 100 | 102 | 100 | 98 |

TABLE 2-continued

|  | Comparison Tire 4 | Present Invention Tire 4 | Present Invention Tire 5 | Present Invention Tire 6 | Comparison Tire 5 |
|---|---|---|---|---|---|
| Ice Braking Performance | 100 | 102 | 103 | 100 | 95 |

As seen from Table 2, the present invention tires in which the groove width is in the range from 0.1 L to 0.25 L can improve wet braking and snow traction performance while ensuring performance on ice.

EXAMPLE 3

Prepared were four test tires each according to the present invention tires 7 to 9 and comparison tires 6 and 7, having the same tire sizes as in EXAMPLE 1; the present invention tires 7 to 9 and comparison tires 6 and 7 each had a pattern shown in FIG. 1, in which the groove width W of the V-shaped transverse grooves with vertexes facing to the reverse rotational direction of the tire, the ratio ACA/GCA of the total ground contact area ACA of the blocks to the ground contact area GCA of the entire tread surface, and the position of each first main see-through groove were as shown in Table 3.

The inclination angle θ of each groove portion of each test tire was 70 degrees, and the second main see-through grooves were located at the positions of 40% of the tire ground contact width EW.

Evaluation testing for wet braking performance, snow traction performance and ice braking performance was carried out on the test tires as in EXAMPLE 1, obtaining the results shown in Table 3.

TABLE 3

|  | Comparison Tire 6 | Present Invention Tire 7 | Present Invention Tire 8 | Present Invention Tire 9 | Comparison Tire 7 |
|---|---|---|---|---|---|
| Groove Width W | 0.2 L | 0.2 L | 0.2 L | 0.2 L | 0.2 L |
| Ratio ACA/GCA (%) | 50 | 55 | 65 | 75 | 80 |
| Main see-through Groove Position (%) | 8 | 8 | 8 | 8 | 8 |
| Wet Braking Performance | 95 | 105 | 110 | 103 | 95 |
| Snow Traction Performance | 95 | 103 | 107 | 103 | 95 |
| Ice Braking Performance | 95 | 100 | 103 | 105 | 105 |

As seen from Table 3, the present invention tires in which the ratio ACA/GCA is in the range from 55% to 75% can improve wet braking and snow traction performance while ensuring performance on ice.

INDUSTRIAL APPLICABILITY

The present invention having the aforementioned excellent effects is very effectively applicable to pneumatic tires for icy and snowy roads.

What is claimed is:

1. A pneumatic tire including a tread surface having a direction of rotation of the tire which is specified in one direction, the tread surface comprising:

a first main see-through groove extending linearly in a circumferential direction of the tire in a region of from 4% to 15% of a ground contact width of the tire from an equatorial plane of the tire toward each of left and right sides;

lug grooves obliquely extending from the first main see-through grooves toward outer sides of the tire in a reverse rotational direction of the tire so as to communicate with ground contact ends of the tire, the lug grooves being disposed at predetermined intervals in the circumferential direction of the tire;

blocks being defined by the lug grooves and the first main see-through grooves;

V-shaped transverse grooves being disposed between the first main see-through grooves at predetermined intervals in the circumferential direction of the tire, the transverse grooves having vertexes that face to the reverse rotational direction of the tire; and blocks being defined by the transverse grooves and the first main see-through grooves, wherein each transverse groove has a groove width W measured in the circumferential direction of the tire, the groove width W being ranged from 0.1 L to 0.25 L with respect to a tire circumferential length L of the block adjacent the transverse groove, a ratio ACA/GCA of a total ground contact area ACA of the blocks to a ground contact area GCA of the entire tread surface being 55% to 75%, wherein the tread surface further comprises a second main see-through groove extending zigzag in the circumferential direction of the tire in a region of from 35% to 45% of the ground contact width of the tire from the equatorial plane of the tire toward each of the left and right sides, wherein the tread surface further comprises a narrow circumferential groove extending in the circumferential direction of the tire between each first main see-through groove and each second main see-through groove, wherein the lug grooves each include a first lug groove extending from the first main see-through groove to the second main see-through groove and a second lug groove extending from the second main see-through groove to at least the ground contact end of the tire, wherein the first lug groove comprises an inner groove part extending from the first main see-through groove to the narrow circumferential groove and an outer groove part extending from the narrow circumferential groove to the second main see-through groove, wherein the inner groove part comprises a one side end groove portion communicating with the first main see-through groove, the other side end groove portion communicating with the second main see-through groove, and an intermediate groove portion extending between the one side end groove portion and the other side end groove portion, the intermediate groove portion having a smaller inclination to the tire circumferential direction than the one side end groove portion and the other side end groove portion, wherein the narrow circumferential groove has a smaller width than the first and the second main see-through grooves.

2. A pneumatic tire according to claim 1, wherein each transverse groove has two groove portions forming the V shape, each of the two groove portions having an inclination angle θ that is 45 degrees to 85 degrees with respect to the circumferential direction of the tire.

3. A pneumatic tire according to claim 1, wherein the first lug grooves are offset from the second lug grooves in the circumferential direction of the tire.

4. A pneumatic tire according to claim 1, wherein the second main see-through grooves are disposed in symmetrical positions with respect to the equatorial plane of the tire.

5. A pneumatic tire according to claim 1, wherein the vertexes of the transverse grooves are located on the equatorial plane of the tire.

6. A pneumatic tire according to claim 1, wherein the first main see-through grooves are disposed in symmetrical positions with respect to the equatorial plane of the tire.

7. A pneumatic tire according to claim 1, wherein each of the blocks has a ground contact face, which has sipes extending in a widthwise direction of the tire.

8. A pneumatic tire according to claim 1, wherein the outer groove part has the same inclination to the tire circumferential direction as the one side end groove portion and the other side end groove portion of the inner groove part.

* * * * *